UNITED STATES PATENT OFFICE.

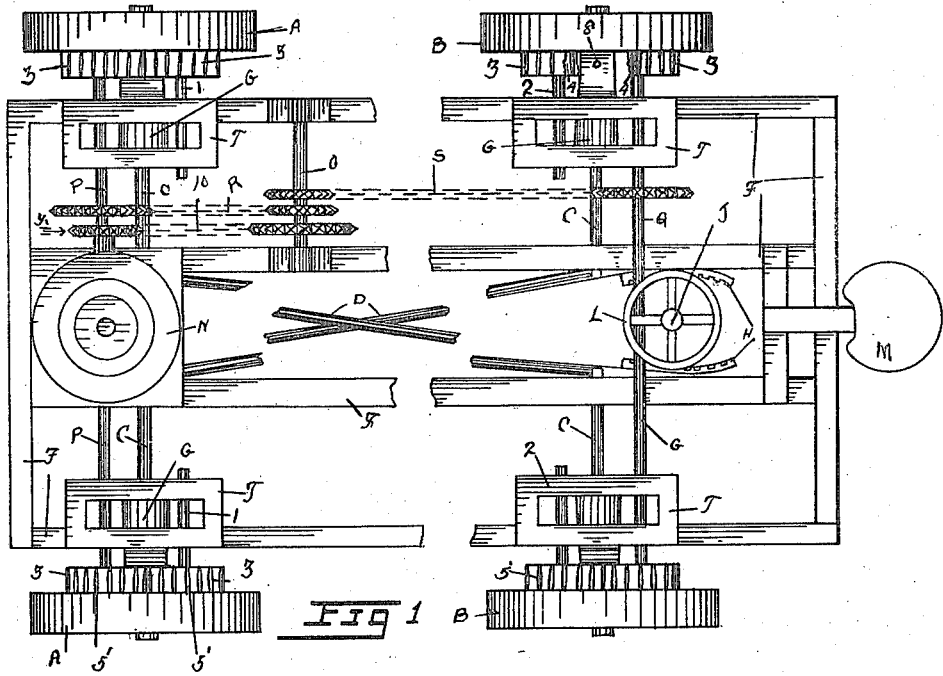
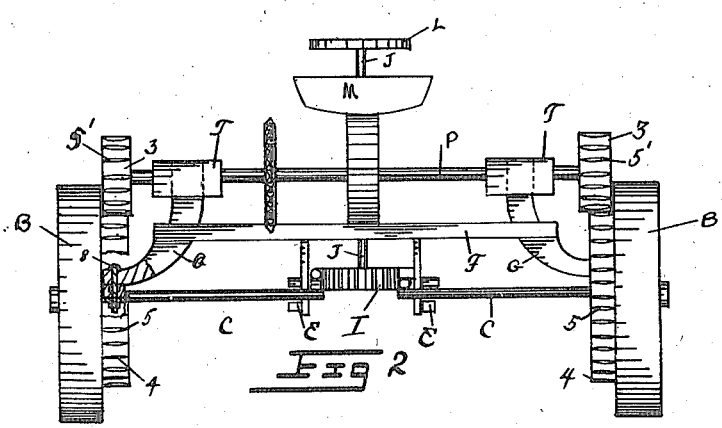

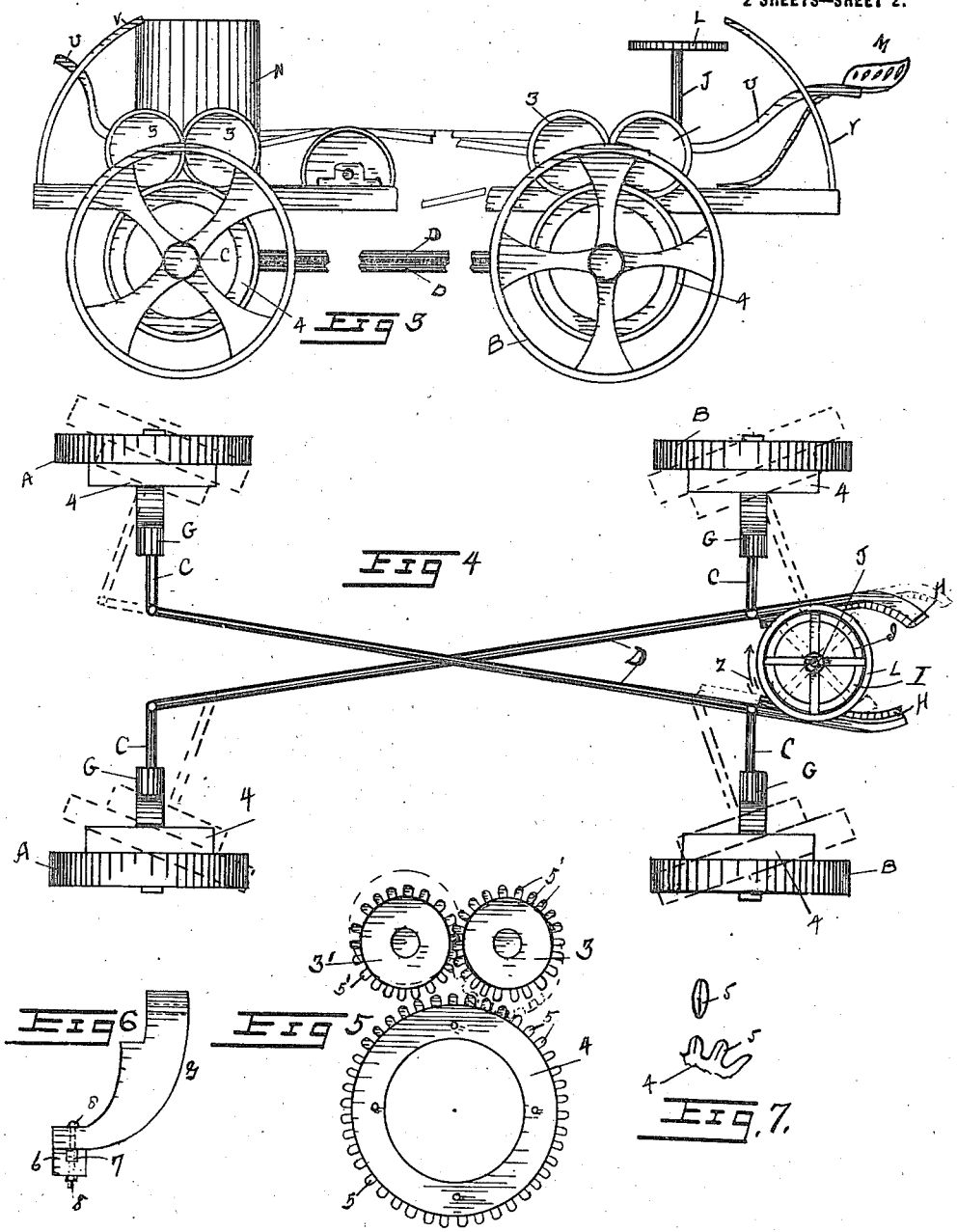

MARTIN HANSEN, OF SALT LAKE CITY, UTAH.

TRACTOR.

1,221,320.  Specification of Letters Patent.  Patented Apr. 3, 1917.

Application filed May 24, 1916. Serial No. 99,554.

*To all whom it may concern:*

Be it known that I, MARTIN HANSEN, a citizen of the United States, residing at Salt Lake City, in the county of Salt Lake and State of Utah, have invented certain new and useful Improvements in Tractors, of which the following is a specification.

My invention relates to self propelled vehicles such as trucks and tractors, and has for its object to provide a four wheeled vehicle on which power is generated and applied to two or to all four of its wheels as desired, thereby securing greater tractive power and more mobility than has heretofore been possible.

These objects I accomplish with the machine illustrated in the accompanying drawings in which similar letters and numerals of reference indicate like parts throughout the several figures, and as described in the specification forming a part of this application and pointed out in the appended claims.

In the drawings in which I have shown a substantial embodiment of my invention, Figure 1 is a plan view of the vehicle, parts cut away. Fig. 2 is an end elevation of the same. Fig. 3 is a side elevation of the machine. Fig. 4 is a plan view of the wheels, axles and guiding mechanism with all of the frames, and power elements omitted, and showing in dotted lines the position of the wheels and axles shifted when desiring to turn to the left. Fig. 5 is an end elevation of one set of the gear wheels by which power is applied to each individual traction wheel, showing in dotted lines the position of the driving gear wheels when shifted to engage the driven gear wheel. Fig. 6 is a side elevation in detail of one of the wheel pivots. Fig. 7 is a detail of one of the elliptical cogs.

In traction vehicles it is desirable to guide the machine and turn on a small surface also greater tractive efficiency is secured if the power is applied to all of the wheels, and in the present invention both of these objects are secured. In the drawings the traction wheels are shown as A for the front wheels and B for the rear wheels. The axles on which the wheels are journaled are stub axles at C, with two reaches D, each of which is pivoted to the inner end of one front axle and the inner end of the rear axle on the opposite side of the vehicle. A frame F is mounted on said axles by means of four wheel pivots G, and the inner end portions of said axles C are supported and slidably operated on depending supports E, which are suspended from said frame F. In order that said reaches may operate in unison and one not interfere with the other, one is carried on a higher plane than the other.

On the front end portion of each of said reaches D a curved rack H is provided, the curves inclined toward each other, and a shifting gear I is mounted and carried on said frame F, the teeth of which mesh with the teeth of said racks H. The said gear is positioned to operate horizontally and a vertical shaft J is secured therein, having a hand wheel L on its upper end by which said gear I is rotated on its axis.

A seat M is mounted on said frame adjacent said hand wheel L, and a gasolene or other form of engine N is mounted on the front portion of said frame F, by which power is supplied to operate the vehicle. The power is transmitted first to a main shaft O journaled on said frame F, and then by means of the chain belts R and S to two shafts P and Q respectively journaled at the front and rear portions of said frame F. Shaft carrying tiltable frames T are pivotally mounted, one on each of said wheel pivots G allowing said frames to be moved on their pivots from the horizontal, and a lever U is fastened on each pair of said frames by which they are moved. The said levers U are held from unintentional movement by the racks V. The said shafts P and Q are journaled in said frames T, and also the counter shafts 1 and 2 are likewise journaled therein. On the outer end of each of said shafts P, Q, 1 and 2 is secured a driving gear 3, eight in number, and tiltable in pairs. When the said shafts 1, 2, P and Q are on the same horizontal plane said gears 3 run idle and the teeth of said respective gears 3 may be made to mesh with the cogs of a driven gear 4, one each of which is concentrically secured on each of said traction wheels A and B. The teeth of each of said wheels 3 and 4 are elliptical in cross section in order that the gear wheels 4 may be partially turned on their respective vertical pivots while rotating on their axes and not cramp the teeth or cogs in their meshing and engagement with the teeth of the contiguous driving gear 3, whose teeth are also given the same shape, as shown at 5 and 5' respectively. In order that said gears 4 may be partially turned to direct the machine to the right or left as desired the interior of each of said gears is cut out so that they have neither hubs nor spokes, as clearly shown in Fig. 5. The axles C pass axially through and are held centrally within said openings. Bearing blocks 6 are made to fit partially around said axles and in each is provided a pivot recess entering from the upper side and within which a hollow pivot 7 that is provided integrally on the lower end of one of said wheel pivots G is operated.

A king bolt 8 is provided for each of said annular gear wheels which in use is passed through said wheel pivot G, the hollow in said pivot 7 and through the axle C contiguous, and if desired a nut may be screwed on its lower end to hold same in place.

The operation of my vehicle is as follows:

With the engine running as indicated by the arrow z power is applied to the said shaft O from the engine N by means of a chain belt 10, and to the shafts P and Q by the chain belts R and S. With the frames T in a horizontal position, the gears 3 would run idle, as they would not be in mesh with any of the gears 4. To start the machine forward the frames T are tilted and the gears 3 are shifted as shown in dotted lines in Fig. 5. In this position cogs of the gear 4 will engage the cogs of the rear one of said gears 3, and as the gears 4 are fastened to the traction wheels A and B they would be rotated and the vehicle advanced. To run the machine backward the said frames T are tilted at the reverse angle and the other gears 3 which rotate in the opposite direction are made to engage with said gears 4. When each pair of axles C are in alinement the vehicle will run in a straight line forward or backward as above described. When it is desired to turn the machine to the right or left the axles are shifted or moved out of alinement. For instance to turn the machine to the left, the hand wheel and the connected gear wheel I are turned in the direction shown by the arrow z, this will move the reaches D longitudinally, one forward and the other backward, and as the axles C are pivoted at the inner ends to said reaches the said axles will be moved to the positions shown in dotted lines in Fig. 4, and the wheels A and B and gears 4 will be turned on the pivot G to the positions shown in said figure by the dotted lines. The elliptical shape or form given to the cogs on the gears 3 and 4 allows said shifting of the gears 4 without cramping or interfering with the meshing and perfect action of said cogs.

I thus provide a road vehicle with power applied to all four wheels by new and novel means, and I have also provided a vehicle, the rear wheels of which may be directed at an opposed angle thereby providing a vehicle which may be turned around on less space than usual.

Having thus described my invention I desire to secure by Letters Patent and claim:—

1. In a self-propelled vehicle the combination of four traction wheels; a stub axle for each wheel; an annular gear concentrically secured on each of said wheels; a wheel pivot for each of said gears; a frame mounted on said pivots; two reaches each of which is pivoted to the inner ends of one rear and one front axle; means to suspend said reaches from said frame and allow longitudinal movement thereof; a rack on the front portion of each of said reaches with the teeth turned inwardly; a gear whose teeth mesh with the teeth of said racks; and means to rotate said gear and thereby to move said axles on said pivots.

2. In a self propelled vehicle the combination of four traction wheels; a stub axle for each wheel; an annular gear concentrically secured on each of said wheels; a wheel pivot for each of said gears; a frame mounted on said pivots; two reaches each of which is pivoted to the inner ends of one rear and one front axle; means to suspend said reaches from said frame and allow longitudinal movement thereof; a rack on the front portion of each of said reaches with the teeth turned inwardly; a gear whose teeth mesh with the teeth of said racks; means to rotate said gear and thereby to move said axles on said pivots; said means consisting of a vertical shaft and a hand wheel on its upper end.

3. In a self propelled vehicle the combination of four traction wheels; a stub axle for each wheel and having a hole vertically therein; an annular gear concentrically secured on each of said wheels; a wheel pivot for each of said gears, each of said pivots consisting of a curved member having a hollow stud depending therefrom; a recessed base having a vertical hole concentrically in said recess and a transverse semi-circular channel in its underside to fit partially around said axle; and a bolt passed vertically through said pivot in alinement with the hollow stud and through said stud and the hole in said base and the hole in the contiguous axle; a frame mounted on said pivots; two reaches each of which is pivoted to the inner ends of one rear and one front axle; and means to simultaneously move one of said reaches longitudinally forward and the other backward and thereby to turn said gears on said pivots.

4. In a self propelled vehicle the combination of four traction wheels; a stub axle for each wheel, an annular gear concentrically secured on each of said wheels; a wheel pivot for each of said gears; means to turn each of said wheels and its connected gears on said pivots; a main frame mounted on said pivots and a tilting frame on each pivot; a power driven shaft mounted on said main frame; two shafts journaled on each of said tilting frames; means to impart the motion of said power driven shaft to one of said shafts mounted on said shifting frames; gear wheels secured on the outer end of said last mentioned shafts the teeth of one meshing with the teeth on the other, and the teeth of either adapted to engage and mesh with the teeth of said annular gear when said tilting frames are moved on their pivots; and means to move said tilting frames on their pivots.

5. In a self propelled vehicle the combination of four traction wheels; a stub axle for each wheel, an annular gear concentrically secured on each of said wheels; a wheel pivot for each of said gears; means to turn each of said wheels and its connected gears on said pivots; a main frame mounted on said pivots and a tilting frame on each pivot; two intermeshing gears mounted on each of said tilting frames; and cogs on said annular gears and on said last mentioned gear, elliptical in cross section and adapted to intermesh when brought into operative position.

6. In a self propelled vehicle the combination of four traction wheels; a stub axle for each wheel, an annular gear concentrically secured on each of said wheels; a wheel pivot for each of said gears; means to turn each of said wheels and its connected gears on said pivots; a main frame mounted on said pivots and a tilting frame on each pivot; two intermeshing gears mounted on each of said tilting frames; cogs on said annular gears and on said last mentioned gear, elliptical in cross section and adapted to intermesh when brought into operative position; means to impart power and rotate said intermeshing gears; and means to move said tilting frames on their pivots, and thereby to bring said annular gears and either of said intermeshing gears into mesh.

In testimony whereof I have affixed my signature in presence of a witness.

MARTIN HANSEN.

Witness:
SAM RANEY.